July 22, 1952
C. M. WOODRUFF
2,604,382
METHOD FOR TESTING AND ANALYZING
THE CONDITION OF SOIL
Filed Dec. 20, 1947
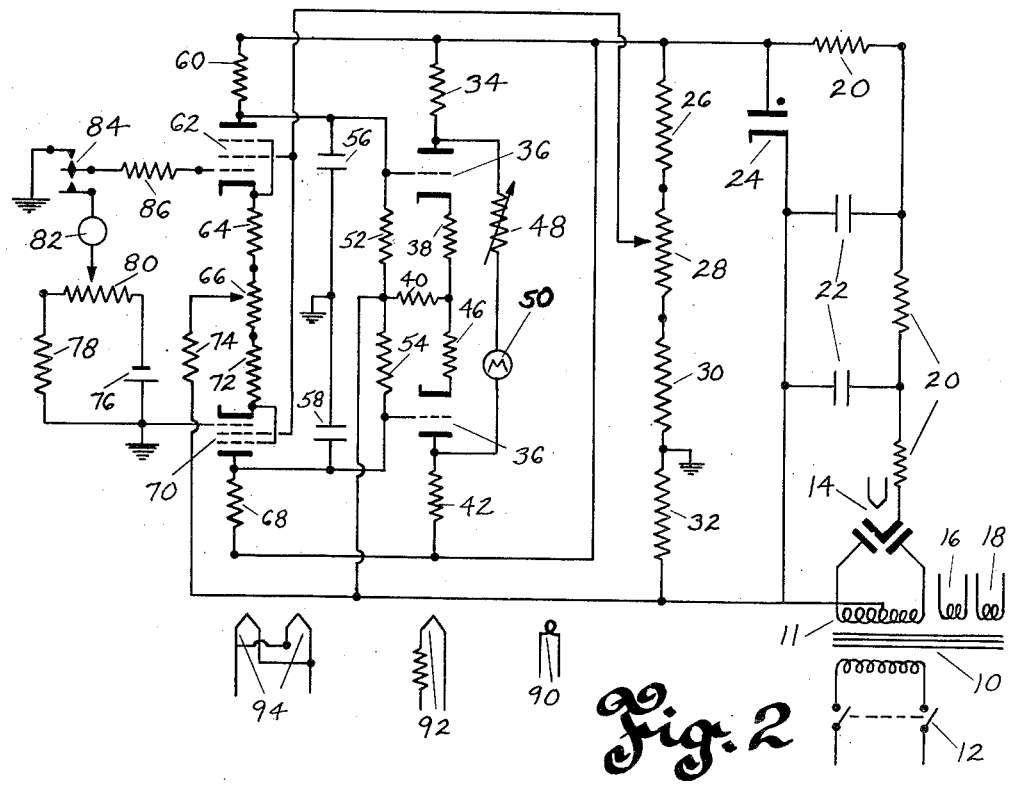
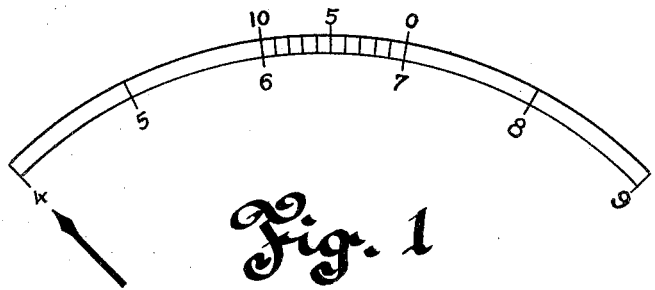
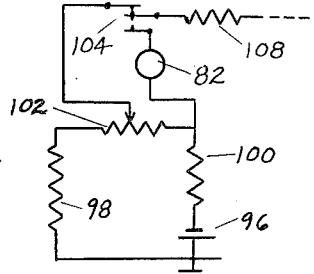
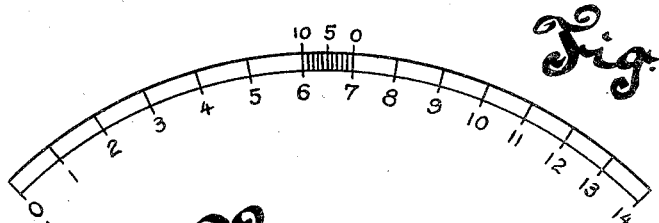
WITNESS:
INVENTOR
CLARENCE M. WOODRUFF
BY
Rey Eilers
ATTORNEY Patented July 22, 1952

2,604,382

UNITED STATES PATENT OFFICE 2,604,382

METHOD FOR TESTING AND ANALYZING THE CONDITION OF SOIL

Clarence M. Woodruff, Columbia, Mo.

Application December 20, 1947, Serial No. 792,873

5 Claims. (Cl. 23—230)

This invention relates to improvements in methods and apparatus for testing and analyzing the condition of soil. More particularly, this invention relates to an improved method and apparatus for quickly and accurately testing the quantity of exchangeable hydrogen ions in given samples of soil.

It is therefore an object of the present invention to provide an improved method and apparatus for quickly and accurately testing and analyzing the quantity of exchangeable hydrogen ions in given samples of soil.

The top soil of the earth constitutes an exchange complex of soil colloids; and that exchange complex has the ability to releasably hold various ions. When the exchange complex, which is the soil, is saturated with metal ions that tend to form basic hydroxides, the soil is said to be "sweet" and it will provide a neutral or basic chemical reaction. However, when the exchange complex, which is the soil, is saturated with exchangeable hydrogen ions, the soil is said to be "sour" and it will provide an acid chemical reaction. In the natural processes of growing plants, the water in the soil can coact with the growing plants to cause or enable hydrogen ions to replace some or all of the exchangeable base-forming metal ions in the soil. When this happens, the soil becomes progressively "sour" or acid; and the ability of the soil to grow certain plants decreases. In particular, "sour" or acid soils rapidly lose their ability to grow leguminous plants. This is undesirable because such plants are very useful in replacing the nitrogen which is removed from the soil by many other useful plants. To keep soils from becoming "sour" or acid, or to "sweeten" soils which have become "sour" or acid, farmer have strewn crushed limestone on their soil; the calcium ions of the limestone gradually replacing the exchangeable hydrogen ions of the exchange complex, which is the soil.

In most instances, the spreading of crushed limestone on the soil, and the subsequent working of that limestone into the soil by plowing and discing, has caused perceptible and effective "sweetening" of the soil; and this "sweetening" has been followed by considerable increases in the ability of the soil to grow plants. In some instances, however, the spreading of the crushed limestone on the soil did not materially increase the ability of the soil to grow plants; principally because too much or too little limestone was strewn on the soil. The exact amount of limestone to be spread on a given soil is not excessively critical, and in fact agronomists are not in complete agreement as to the exact amount of limestone that should be spread on any given soil; however, it is fully agreed by agronomists that some amounts of limestone can be harmful because they are excessive, and it is also fully agreed by agronomists that other amounts of limestone can be of but little value because they are insufficient. Consequently, it has become of great importance to ascertain with exactitude the quantity of exchangeable hydrogen ions in any given samples of soil; for once this has been done, the agronomists can determine just how much limestone is needed. It is therefore an object of the present invention to provide a simple, quick, and accurate method of determining the amount of exchangeable hydrogen ions in samples of soil.

One method that has been used to attain information about the exchangeable hydrogen ions in soil contemplates adding samples of the soil to water and then measuring the pH value of the resulting suspension. This measurement can be made in various ways, but it is conveniently made by using an electric pH meter; because all that need be done is to add the soil to water, insert the glass electrode and calomel electrode of the pH meter in the resulting suspension, and note the position of the needle of the meter. However made, a simple determination of the pH value of the soil does not give sufficient information to the agronomist; for the pH value of the soil merely indicates the approximate ratio of base-forming metal ions to exchangeable hydrogen ions in the suspension, and it does not indicate the amount of exchangeable hydrogen ions in the exchange complex, which is the soil. Another method contemplates the leaching out of all exchangeable ions in the soil by treating the soil with ammonium compounds that will replace the exchangeable ions with ammonium ions. Thereafter, the fluid passing through the soil is collected, dehydrated, fired, and analyzed for base-forming metals, while the soil is heated to decompose the ammonium ions to form free ammonia, and the ammonia is collected and measured; the difference between the number of ammonia ions and the base-forming metal ions equalling the amount of exchangeable hydrogen ions originally held by the soil. This method is time consuming, and it can only be practiced successfully by skilled and experienced personnel. Still another method contemplates the mixing of an ammonium acetate solution with soil, waiting about one (1) hour for the ions in the solution to replace hydrogen ions, and then measuring the pH value of the resulting solution. This method is slow, and it requires a skilled operator because the solution has a non-linear titration curve and because the change in pH value, per unit of hydrogen in each one hundred (100) grams of soil, is less than five one hundredths (0.05) of a pH unit. For these various reasons, prior methods of attaining information about the exchangeable hydrogen ions in soil are objectionable.

The present invention provides a method that avoids these objections; and that method includes introducing soil into a solution that can quickly replace the hydrogen ions in the soil and that is buffered to have a pH value close to neutrality; and then measuring the change in that pH value. Where this change is large relative to the amount of soil admixed with the solution but is relatively small compared to the initial pH of the solution, it directly indicates the amount of exchangeable hydrogen ions in the soil. Instead of merely indicating the ratio of exchangeable base-forming ions to exchangeable hydrogen ions in the soil, this method provides an exact measurement of the amount of exchangeable hydrogen ions in the soil. This method is most effective where the solution is buffered to a pH value of, or near, seven (7). It is therefore an object of the present invention to provide a method of testing soils that contemplates introducing soil into a solution that is buffered to a given pH value and then measuring the change in pH value due to the soil.

Various solutions could be used in practicing the method contemplated by the present invention; but in those solutions, decreases in pH value due to the addition of exchangeable hydrogen ions will be linear. Where the pH is determined by an electric pH meter, a non-linear decrease in pH value requires the use of a non-linear scale on the meter. Such scales are difficult to make and are difficult to use; consequently it is desirable to provide a solution wherein the decrease in pH value, due to the addition of exchangeable hydrogen ions, is linear. The present invention provides such a solution; and it is therefore an object of the present invention to provide a solution wherein the decrease in pH value, due to the addition of exchangeable hydrogen ions, is linear.

Prior methods of attaining information, about the exchangeable hydrogen ions in soil, yielded a ratio or a number which could be used to calculate and ascertain the amount of limestone to be spread on the soil. If the ratio or figure was correctly obtained, and if the subsequent calculations were free from error, the proper amount of limestone would be strewn on the soil; but the possibility of error in such calculations is high. The method, provided by the present invention, largely eliminates possible errors; and it does so by providing a scale for pH meters that directly indicates either the exchangeable hydrogen in milliequivalents per hundred (100) grams of soil or the number of thousands of pounds of limestone required for each acre of soil. Such a scale permits error-free work by unskilled personnel. It is therefore an object of the present invention to provide a scale for pH meters that directly indicates the number of milliequivalents of hydrogen per hundred (100) grams of soil or the number of thousands of pounds of limestone required for each acre of soil.

Other and further objects and advantages of the present invention should become apparent from an examination of the drawing and accompanying description.

In the drawing and accompanying description two preferred embodiments of the present invention are shown and described but it is to be understood that the drawing and accompanying description are for the purposes of illustration only and do not limit the invention and that the invention will be defined by the appended claims.

In the drawing, Fig. 1 is a view of a scale that is usable on a pH meter to indicate the exchangeable hydrogen in milliequivalents per hundred (100) grams of soil or the number of thousands of pounds of limestone required per acre of soil.

Fig. 2 is a schematic diagram of a novel circuit for an electronic voltmeter, and that voltmeter can be equipped with the scale of Fig. 1, Fig. 3 is a view of another scale that can be used on a pH meter to indicate the exchangeable hydrogen in milliequivalents per hundred (100) grams of soil or the number of thousands of pounds of limestone required per acre of soil, and Fig. 4 is a schematic diagram of a modification for a portion of the circuit shown in Fig. 2.

Referring to the drawing in detail, the numeral 10 generally denotes a power transformer with one primary winding and three secondary windings. The primary winding of the transformer 10 is selectively connected to a source of alternating current by the double pole, single throw switch 12. The terminals of secondary winding 11 of transformer 10 are connected to the plates of double diode 14, and the center tap of winding 11 is connected through various resistors to the cathode of double diode 14. Thus the winding 11 provides the plate to cathode voltage for that double diode 14. The secondary winding 16 provides the filament voltage for the filament of double diode 14 the filament 92 of duotriode 36, and the filament of pilot light 90 by suitable wires not shown. Secondary winding 18 provides the filament voltage for the filaments 94 of pentodes 62 and 70 of the circuit by suitable wires, not shown. Resistors 20 and condensers 22 form a filter, of usual form and design, that extends between the cathode of double diode 14 and the voltage regulator tube 24. The tube 24 is connected across a voltage divider which includes series-connected resistors 26, 28, 30 and 32. Resistor 28 is a variable resistor which provides a positive voltage for the screen grids of pentodes 62 and 70. The junction of resistors 30 and 32 is connected to ground, thus fixing the potential for the control grid of pentode 70 and providing a fixed potential for the control grid of pentode 62 when the single pole, double throw switch 84 is in its upper position.

The voltage across the voltage divider formed of resistors 26, 28, 30 and 32 is applied across the upper plate and cathode of duotriode 36 by means of plate load resistor 34, cathode resistor 38 and common cathode resistor 40. That same voltage is applied across the lower plate and cathode of duotriode 36 by means of plate resistor 42, cathode resistor 46, and common cathode resistor 40. A meter circuit, which includes variable resistor 48 and ammeter 50 is connected to both of the plates of duotriode 36.

The voltage from the voltage divider formed of resistors 26, 28, 30 and 32 is applied across pentode 62 by means of plate load resistor 60, cathode resistor 64, potentiometer 66, and common cathode resistor 74. That same voltage is applied across pentode 70 by means of plate load resistor 68, cathode resistor 72, potentiometer 66, and common cathode resistor 74. The voltage from that voltage divider is also applied across the parallel resistance paths through resistors 60 and 52 in the one instance and through resistor 68 and 54 in the other instance. The control grids of duotriode 36 are connected to the plates of pentodes 62 and 70. Condensers 56 and 58 respectively extend between ground and the plates of pentodes 62 and 70.

With this arrangement of parts, the potentiometer 66 can be adjusted to balance the rate of flow of current through pentodes 62 and 70. At such time, the plate voltages of pentodes 62 and 70 will be identical because the resistors 60 and 68 are of the same magnitude. The control grid voltages of duotriode 36 will also be identical; and the voltages on the plates of duotriode 36 will be the same since the plate load resistors 34 and 42 are of the same magnitude and since the cathode resistors 38 and 46 are of the same magnitude. When this condition exists, no current will pass through ammeter 50, and that meter will be at rest. Current will however pass through the meter 50 when the grid voltage of pentode 62 varies relative to the grid voltage of pentode 70, for such variation will change the grid voltages of duotriode 36 and unbalance that duotriode.

The grid voltage of pentode 62 may be controlled by the subcircuit which includes battery 76 or a suitable section of the voltage divider regulated by voltage regulator tube 24, resistance 78, potentiometer 80, glass and calomel electrodes 82, switch 84, and resistor 86 of Fig. 2; or it may be controlled by the subcircuit which includes battery 96 or a suitable section of the voltage divider regulated by voltage regulator tube 24, resistor 98, resistor 100, potentiometer 102, switch 104, glass and calomel electrodes 82, and resistance 108. The subcircuits of Figs. 2 and 4 are interchangeable in the circuit of Fig. 2; the change merely affecting the position of rest of the needle in meter 50. Selective operation of the switch 84 or 104 will cause the grid of pentode 62 to assume a reference voltage or to assume the voltage developed by the glass and calomel electrodes 82. By setting the circuit so it is in balance when the switch 84 or 104 connects the grid of pentode 62 to a reference voltage, the circuit can be use to compare the voltages from the glass and calomel electrodes 82 with the known voltage of battery 76 or 96. By proper calibration of the circuit constants and by proper calibration of the scale of meter 50 it is possible to have the meter 50 give direct readings of the pH values of solutions in which the glass and calomel electrodes 82 are immersed.

The prinicpal difference between the subcircuit of Fig. 2 and the subcircuit of Fig. 4 is the value of the voltage applied to the control grid of pentode 62 when switch 84 or 104 is in its upper position. In Fig. 2, that voltage is ground, and the needle of the meter 50 will return to its left hand position when the switch 84 applies that voltage to the grid of pentode 62. In Fig. 4, that voltage is below ground, and the needle will not return to its left hand position when the switch 104 applies that voltage to the grid of pentode 62; instead, the needle will move to a predetermined meter reading. Such an arrangement minimizes the difference between the voltages at the two contacts of switch 104, when the glass and calomel electrodes are immersed in solution, and thus it enables the needle of the meter 50 to start from a value equivalent to the pH value of a standard solution rather than from the left hand position of the meter scale. Where that standard solution is a buffered solution and is admixed with the sample of soil, the needle of the meter will not have to move very far; and its displacement from its nearby resting point is easily determined, even by relatively unskilled personnel. Moreover, this arrangement obviates the need of "tell tale" pointers which are customarily provided in pH meters. Such pointers usually take the form of manually adjustable hands, adjacent the scale of the meter, that act as reference points; and they increase the cost of making the meters and render the use of the meters somewhat confusing. It has been found that operators using the circuit of Fig. 2, as modified by the subcircuit of Fig. 4, make fewer errors in reading the values indicated by the needle of the meter than those operators make when using the circuit of Fig. 2. While errors are infrequent in either case, the number of errors occuring with the circuit of Figs. 2 and 4 is only about fifteen percent (15%) of the number of errors occuring with the circuit of Fig. 2.

This feature is not the only novelty of the circuits shown in Figs. 2 and 4 for those circuits make possible the construction of an electronic pH meter from inexpensive and conventional radio parts. Prior pH meters, used with glass and calomel electrodes, required special and expensive vacuum tubes and special and expensive meters. The circuits of Figs. 2 and 4 are made from conventional, inexpensive parts; and thus are quicker, easier and cheaper to build and maintain. Instead of relying primarily upon the electrical characteristics of the vacuum tubes used, and thus being forced to employ special and expensive vacuum tubes, the circuits of Figs. 2 and 4 rely upon the balancing of the plate and cathode resistors of pentodes 62 and 70 to indicate changes in pH. This fact, makes the circuit practically independent of temperature changes and vacuum tube constants, and it cooperates with the direct coupling of the two stages of amplification to enable conventional radio tubes and a moderately sensitive milliammeter to provide stable and accurate determinations of pH values.

In operating the circuit shown in Fig. 2, switch 84, which is preferably biased to its upper position, applies an initial potential to the control grid of pentode 62, and potentiometer 66 is adjustable to set the needle of meter 50 adjacent the four of the scale in Fig. 1 or the left hand zero of the scale in Fig. 3. At this time, the voltages on the control grids of pentodes 62 and 70 are equal, and the plate voltages of duotriode 36 are equal. Thereafter the glass and calomel electrodes, which are preferably glass electrode No. 1190 and calomel electrode No. 1170 manufactured and sold by the National Technical Laboratories of Pasadena, California, are immersed in a solution of known pH, preferably four (4), and the switch 84 is moved to its lower position. The glass and calomel electrodes will create a difference of potential which is proportional to the pH value of the solution; and that difference of potential can cooperate with the voltage developed in potentiometer 80 by battery 76 to shift the grid voltage of pentode 62 relative to the grid voltage of pentode 70. Resistor 86 in the grid circuit of pentode 62 is quite large, and it acts to keep sharp transient voltages or interfering radiated energy, of external sources, from affecting the voltage on the control grid of pentode 62; and it also limits the currents which might tend to flow from that grid through the glass and calomel electrodes 82, which currents must be kept from those electrodes to insure proper functioning of those electrodes. Any shift in the control grid voltage of pentode 62 changes the conductivity of that pentode, thus causing a change in the current through plate load resistor 60 and common cathode resistor 74. These changes will directly change the plate voltage of pentode 62 and will indirectly change the plate voltage of pentode 70, as by changing the cathode-to-grid bias of that tube by changing the cathode voltage and thus changing the conductivity of that tube. The change in the plate voltage of pentode 70 will be almost equal to the change in plate voltage of pentode 62, but it will be opposite in polarity; thus providing an amplified voltage change for the grids of duotriode 36.

The changes in voltage at the plates of pentodes 62 and 70 are transmitted to the grids of duotriode 36 by the series connection between plate load resistor 60 and grid resistor 52, and the series connection between plate load resistor 68 and grid resistor 54. This series connection limits peak voltages at the grids of duotriode 36 when the switch 12 is first closed, and it also establishes the steady state voltages of the duotriode grids while minimizing the effects of variations in current flow through pentodes 62 and 70. The condensers 56 and 58, which are connected between ground and the plates of pentodes 62 and 70 eliminate sharp transient voltages and alternating voltages that otherwise would tend to affect the grid voltages of duotriode 36. The transmitted changes of voltage from pentodes 62 and 70 cause the grid of duotriode 36 to change the conductivity of each section of that tube; and that change in conductivity cooperates with plate load resistors 34 and 42 and common cathode resistor 40 of duotriode 36 to change the voltages of the plates of duotriode 36. This change in voltage causes the needle of meter 50 to move from its left hand position. Thus, if the total grid voltage in the lower position of switch 84 is different from the grid voltage in the upper position of switch 84, the needle of meter 50 will move. The potentiometer 80 can be adjusted to place the needle of meter 50 at pH four (4) on the scale of Fig. 1 or at the left hand zero on the scale of Fig. 3.

Thereafter, a solution of known pH value, preferably seven (7), is used to immerse the glass and calomel electrodes 82. This will cause the needle of meter 50 to move to a new position, when switch 84 is moved to its lower position and variable resistor 48 can be adjusted to set the needle adjacent the pH value on the meter scale which corresponds to the pH value of the solution. In the preferred case, the needle will be at seven. This completes the calibration and adjustment of the electronic pH meter; and thereafter, immersion of the glass and calomel electrodes 82 in solutions of unknown pH values will cause the needle of meter 50 to move and indicate the correct pH values of those solutions.

The adjustment and calibration of the circuit of Fig. 2, as modified by the substitution of the subcircuit of Fig. 4 for the subcircuit including resistor 86, switch 84, glass and calomel electrodes 82, potentiometer 80, battery 76 and resistor 78, is similar to the adjustment and calibration just described. The principal difference is that the needle of the meter 50 need not return to the left hand end of the meter scale when the switch 104 is moved to its upper position; instead it can return to a position that indicates a predetermined pH value. That value can be set by adjustment of the potentiometer 102. In adjusting and calibrating the modified circuit, a solution of known pH value, preferably four (4), is used to immerse the glass and calomel electrodes 82, while switch 104 is in its lower position; and potentiometer 66 is adjusted until the needle of meter 50 is adjacent the pH value four (4) on the meter scale. Thereafter, a solution of known pH preferably seven (7), is used to immerse glass and calomel electrodes 82 while switch 104 is in its lower position; and variable resistance 48 is adjusted to move the needle of meter 50 adjacent the pH value seven (7) on the meter scale. Subsequently, switch 104 can be moved to its upper position and potentiometer 102 can be adjusted until the needle of meter 50 indicates a given pH value preferably seven (7). This shifts the resting point of the needle of meter 50 from its usual point to a given point on the meter scale.

In using the electronic pH meter shown in Figs. 2 and 4 to test samples of soil, after that meter has been balanced and given the desired "gain," a solution with a pH value of seven (7) is used to immerse the glass and calomel electrodes 82. If the needle of meter 50 indicates a pH value of seven (7), the solution is moved from the electrodes 82, a sample of soil is intimately mixed with that solution, and the resulting solution is again used to immerse the glass and calomel electrodes 82. During the mixing operation, replaceable hydrogen ions in the soil will enter into reaction with the ions in the resulting solution, thus changing the pH value of the resulting solution. This change will immediately be indicated on the scale of the meter 50 when the electrodes 82 are immersed in the resulting solution, thus giving a direct reading of the number of exchangeable hydrogen ions in the sample of soil.

Where the solution is enabled to provide a linear titration curve, the change in pH value will be directly proportional to the swing of the needle of meter 50; and the divisions between pH values on the meter scale can be equally spaced, as indicated in Figs. 1 and 3. The space between pH value six (6) and pH value seven (7) in each instance is preferably subdivided into ten equal graduations; each of which graduations indicates a tenth of a pH value or one milliequivalent of hydrogen per hundred (100) grams of soil. In addition, where limestone of the proper size is used, each graduation can indicate a need of one thousand (1000) pounds of limestone per acre of soil. When the buffered solution has had the soil added to it, it will be easy to note the exact depression of the pH of the solution; the scale of Fig. 1 being somewhat easier to interpolate than the scale of Fig. 3. With the scale of Fig. 1, it is possible to obtain an accurate determination of pH to two figures and to interpolate the third figure, thus providing a very accurate determination of the change in pH value due to the exchangeable hydrogen ions in the soil.

The meter 50 is preferably a zero to one milliampere meter, and it is set so a reading of 0.6 milliamperes corresponds to a pH value of seven (7). Where the initial balance of the electronic pH meter was made with the needle at four (4), the pH meter is calibrated so it will accurately read the pH of unknown solutions between pH values of four (4) and nine (9), with each tenth (1/10) of a milliampere corresponding to one pH unit.

Several different solutions could be used with the meter in making determinations of exchangeable hydrogen or the lime requirements of soils; but each solution must be buffered at or near a pH value of seven (7) because the depression of the pH values, of solutions with such initial pH values, is related to the exchangeable hydrogen ions in those soils. The solutions should have pH values in the range from four (4) to eight (8). One way of making such a solution includes mixing the salts of nitrophenol with those salts of acetic acid which contain any one or a mixture of the basic cations, such as calcium, magnesium, barium, sodium, or potassium or contain a mixture of those cations together with small amounts of copper, zinc, lead, or lithium. Such a solution is brought to neutrality or pH seven (7) by the addition of suitable ingredients of the basic or acid forms of the respective ingredients. A particularly desirable solution of this type can be made by adding approximately eight (8) grams of paranitrophenol, forty (40) grams of calcium acetate, and one and one quarter (1.25) grams of sodium hydroxide to a liter of water. When ten parts of this solution are added to five (5) parts of soil, a decrease in pH will result such that each tenth of a pH unit on the meter scale represents a milli-equivalent of exchangeable hydrogen ions for each one hundred (100) grams of soil. In using this solution, any change in the pH of the solution, consequent upon its admixture with soil, will indicate directly the amount of exchangeable hydrogen in the soil; and it will also indicate the amount of limestone that must be added to the soil to replace the hydrogen ions and make the soil "sweet." Where the limestone that is used on the soil is ten-mesh millrun limestone, each one tenth (1/10) of a pH unit on the scales of Figs. 1 and 3 not only represents a milli-equivalent of exchangeable hydrogen ions for each one hundred (100) grams of soil, but it also represents one thousand (1000) pounds of limestone required per acre. Thus, if the test solution is initially seven (7) pH and that solution, as admixed with soil, has a reading of six and six tenths (6.6), the soil needs four thousand (4000) pounds of ten-mesh millrun limestone. This arrangement of the meter and its circuit constants is quite desirable because it eliminates all calculations required by unskilled personnel. All that the operator need do is to calibrate and adjust the meter, in the simple and easy manner heretofore described, then mix the sample of soil with the test solution, and obtain a reading on the meter. Thereafter the change, from pH value seven (7), which is indicated on the zero to ten (0–10) scale between pH value seven (7) and pH value six (6) need only be multiplied by one thousand (1000) to give the exact number of pounds of limestone required per acre for that particular soil. The scales of Figs. 1 and 3 are preferably used with the meter which has the circuits of Figs. 2 and 4, but they can be used with other pH meters.

The hereindescribed method of making solutions is quite desirable because it provides solutions that have linear titration curves. Such solutions simplify the testing, and they provide a high degree of accuracy for the tests. Moreover, those solutions avoid the undesirable ammonium cation; and in doing so these solutions utilize the cations which permit a complete test in fifteen (15) minutes, and which dominate the exchange complex, which is the soil. In fact, it is possible to admix the various cations in a given solution so they correspond closely to the mixture of cations in the soil to be tested; and this further increases the accuracy of this method.

In using the meter 50, it is possible to permit the needle to return to its left hand position each time a reading is completed. It is easier and quicker however to hold that needle at pH value seven (7) where the pH value of the test solution is seven (7); and this is easily done by means of the subcircuit of Fig. 4. Where this is done, the needle is initially positioned within a few degrees of its final position and it need move only a short distance to indicate the number of replaceable hydrogen ions in the soil; as a result, the operator's attention is always directed to the zero to ten (0–10) scale between pH value six (6) and pH value seven (7). This minimizes errors in making determinations of the amount of limestone needed.

Whereas two preferred embodiments of the present invention are shown and described in the drawing and accompanying description it should be obvious to those skilled in the art that various changes may be made in the form and practice of the invention without affecting the scope thereof.

What I claim is:

1. The method of determining the amount of exchangeable hydrogen ions in sample of soil and thereby determining the lime requirements of such soils that comprises preparing a solution which consists essentially of paranitrophenol and calcium acetate adding pH-regulating ions until the pH of said solution reaches a value of about seven, admixing said solution with a sample of soil so the calcium ions of said solution can replace the exchangeable hydrogen ions of the soil and measuring the pH value of the resulting solution to determine the change in pH value due to the replacement of the exchangeable hydrogen ions of the soil by the said calcium ions.

2. The method of determining the amount of exchangeable hydrogen ions in samples of soil and thereby determining the lime requirements of such soils that comprises preparing a solution which consists essentially of paranitrophenol and an acetate of the group of basic metallic cations comprising calcium, magnesium, barium, sodium, and potassium, adding pH-regulating ions until the pH of said solution reaches a value of about seven, admixing said solution with a sample of soil so the basic metallic cations of said solution can replace the exchangeable hydrogen ions of the soil, and measuring the pH value of the resulting solution to determine the change in pH value due to the replacement of the exchangeable hydrogen ions of the soil by the said basic metallic cations.

3. The method of determining the amount of exchangeable hydrogen ions in samples of soil and thereby determining the lime requirements of such soils that comprises preparing a solution of 0.0516 molecular weight of paranitrophenol and 0.227 molecular weights of acetic acid per liter of water, adding basic metallic cations to adjust the pH of said solution to a value of about seven, admixing said solution with a sample of soil so the basic metallic cations of said solution can replace the exchangeable hydrogen ions of the soil, and measuring the pH value of the resulting solution to determine the change in pH value due to the replacement of the exchangeable hydrogen ions of the soil by the said basic metallic cations, said solution reacting with exchangeable hydrogen ions to provide a linear titration curve.

4. The method of determining the amount of exchangeable hydrogen ions in samples of soil and thereby determining the lime requirements of such soils that comprises preparing a solution of eight grams of paranitrophenol and forty grams of calicum acetate in water sufficient to make a liter of solution, adding one and one quarter grams of sodium hydroxide to adjust the pH of the solution to a predetermined initial value, admixing said solution with a sample of soil so the calcium ions of said solution can replace the exchangeable hydrogen ions of the soil, and measuring the pH value of the resulting solution to determine the change in pH value due to the replacement of the exchangeable hydrogen ions of the soil by the said calcium ions.

5. The method of determining the amount of exchangeable hydrogen ions in samples of soil and thereby determining the lime requirements of such soils that comprises preparing a solution of paranitrophenol, an acetate of the group of basic metallic cations consisting of calcium, magnesium, barium, sodium, and potassium, and small quantities of metallic ions of the group consisting of copper, zinc, lead, and lithium, adjusting the pH of the solution to a value of about seven, admixing said solution with a sample of soil so the basic metallic cations of said solution can replace the exchangeable hydrogen ions of the soil, and measuring the pH value of the resulting solution to determine the change in pH value due to the replacement of the exchangeable hydrogen ions of the soil by the said basic metallic cations.

CLARENCE M. WOODRUFF.

REFERENCES CITED

The following references are of record in the file of this patent:

UNITED STATES PATENTS

| Number | Name | Date |
|---|---|---|
| 1,520,891 | Spurway | Dec. 30, 1924 |
| 1,783,559 | Cone | Dec. 2, 1930 |
| 1,929,292 | Clair | Oct. 3, 1933 |
| 2,099,298 | Fracker | Nov. 16, 1937 |
| 2,178,550 | Acree | Nov. 7, 1939 |
| 2,232,211 | Cary | Feb. 18, 1941 |
| 2,367,949 | Langer | Jan. 23, 1945 |
| 2,385,471 | Scharer | Sept. 25, 1945 |